US010557980B2

(12) United States Patent
Jungwirth

(10) Patent No.: US 10,557,980 B2
(45) Date of Patent: Feb. 11, 2020

(54) APPARATUS AND METHOD FOR A HOLOGRAPHIC OPTICAL FIELD FLATTENER

(71) Applicant: Honeywell International Inc., Morris Plains, NJ (US)

(72) Inventor: Matthew Edward Lewis Jungwirth, Golden Valley, MN (US)

(73) Assignee: Honeywell International Inc., Morris Plains, NJ (US)

( * ) Notice: Subject to any disclaimer, the term of this patent is extended or adjusted under 35 U.S.C. 154(b) by 34 days.

(21) Appl. No.: 15/630,430

(22) Filed: Jun. 22, 2017

(65) Prior Publication Data

US 2018/0372934 A1    Dec. 27, 2018

(51) Int. Cl.
| | |
|---|---|
| G02B 5/32 | (2006.01) |
| G03H 1/02 | (2006.01) |
| G01S 3/786 | (2006.01) |
| G01C 21/16 | (2006.01) |
| G01C 21/02 | (2006.01) |
| G03H 1/04 | (2006.01) |
| G03H 1/30 | (2006.01) |

(52) U.S. Cl.
CPC .............. *G02B 5/32* (2013.01); *G01C 21/165* (2013.01); *G01S 3/7862* (2013.01); *G03H 1/0272* (2013.01); *G03H 1/30* (2013.01); *G01C 21/025* (2013.01); *G03H 2001/0439* (2013.01)

(58) Field of Classification Search
CPC .............. G02B 5/32; G02B 2027/0174; G02B 5/0252; G02B 5/1814; G02B 5/1842; G02B 5/1866; G02B 5/1876; G02B 5/203; G01S 3/7862; G01C 21/165; G01C 21/025; G03H 1/0272; G03H 2001/0439; G03H 1/2286; G03H 1/0402
USPC ................................... 359/15, 19, 22, 25, 35
See application file for complete search history.

(56) References Cited

U.S. PATENT DOCUMENTS

| | | | |
|---|---|---|---|
| 3,048,352 A | 1/1954 | Hansen | |
| 3,015,457 A | 1/1962 | Dixson | |
| 4,678,263 A * | 7/1987 | Funato | G02B 26/106 |
| | | | 359/18 |
| 5,012,081 A | 4/1991 | Jungwirth et al. | |
| 5,396,326 A | 3/1995 | Knobbe et al. | |
| 5,809,457 A | 9/1998 | Yee et al. | |
| 6,272,432 B1 | 8/2001 | Li et al. | |
| 6,285,927 B1 | 9/2001 | Li et al. | |
| 6,343,767 B1 | 2/2002 | Sparrold et al. | |

(Continued)

OTHER PUBLICATIONS

European Patent Office, "Extended European Search Report from EP Application No. 16159288.6 dated Aug. 22, 2016", "from Foreign Counterpart of U.S. Appl. No. 14/865,709", filed Aug. 22, 2016, pp. 1-8, Published in: EP.

(Continued)

*Primary Examiner* — Jade R Chwasz
(74) *Attorney, Agent, or Firm* — Fogg & Powers LLC

(57) ABSTRACT

A method is provided. The method comprises: receiving incident light, from an object surface, on a top surface of a holographic optical field flattener (HOFF); transforming direction of light, with a hologram, if the light is incident on a portion of the HOFF at an angle equal to a non-zero field angle of the portion; and emitting transformed light from a bottom surface of the HOFF.

13 Claims, 7 Drawing Sheets

(56) References Cited

U.S. PATENT DOCUMENTS

| | | | | |
|---|---|---|---|---|
| 6,552,990 | B1* | 4/2003 | Kajiyama | G11B 7/08582 369/112.06 |
| 6,639,698 | B2* | 10/2003 | Choi | G02B 26/106 235/462.34 |
| 7,898,712 | B2 | 3/2011 | Adams et al. | |
| 8,009,543 | B2 | 8/2011 | Bae et al. | |
| 8,049,886 | B1 | 11/2011 | Raksi | |
| 8,400,700 | B2 | 3/2013 | Adams et al. | |
| 8,597,025 | B2 | 12/2013 | Belenkii et al. | |
| 9,644,920 | B2 | 5/2017 | Jahromi et al. | |
| 2005/0195505 | A1 | 9/2005 | Braun et al. | |
| 2006/0028550 | A1 | 2/2006 | Palmer, Jr. et al. | |
| 2008/0046138 | A1 | 2/2008 | Fowell et al. | |
| 2009/0177398 | A1 | 7/2009 | Belenkii et al. | |
| 2010/0157771 | A1* | 6/2010 | Ross | G11B 7/0065 369/103 |
| 2011/0285981 | A1 | 11/2011 | Justice et al. | |
| 2013/0044317 | A1 | 2/2013 | Justice et al. | |
| 2016/0282123 | A1 | 9/2016 | McCroskey et al. | |

OTHER PUBLICATIONS

Lacoursiere et al., "Large-Deviation Achromatic Risley Prisms Pointing Systems", "Optical Scanning 2002", Jun. 6, 2002, pp. 123-131, Publisher: Proc. SPIE vol. 4773.

Craig Schwarze, "A New Look at Risley Prisms", "Photonics Spectra", Jun. 2006, pp. 1-5, Publisher: OPTRA, Inc.

Jungwirth et al., "Risley Prism Based Star Tracker and Celestial Navigation Systems", "U.S. Appl. No. 15/604,501, filed May 24, 2017", May 24, 2017, pp. 1-17.

Willhite, "An Analysis of ICBM Navigation Using Optical Observations of Existing Space Objects", Jun. 2004, pp. 1-123, Publisher: Department of Aeronautics and Astronautics, Published in: US.

U.S. Patent and Trademark Office, "Restriction Requirement for US. Appl. No. 15/604,501 dated Dec. 18, 2018", p. 1-6, Published in: US.

U.S. Patent and Trademark Office, "Notice of Allowance", U.S. Appl. No. 15/604,501, dated Apr. 10, 2019, pp. 1-13, Published: US.

* cited by examiner

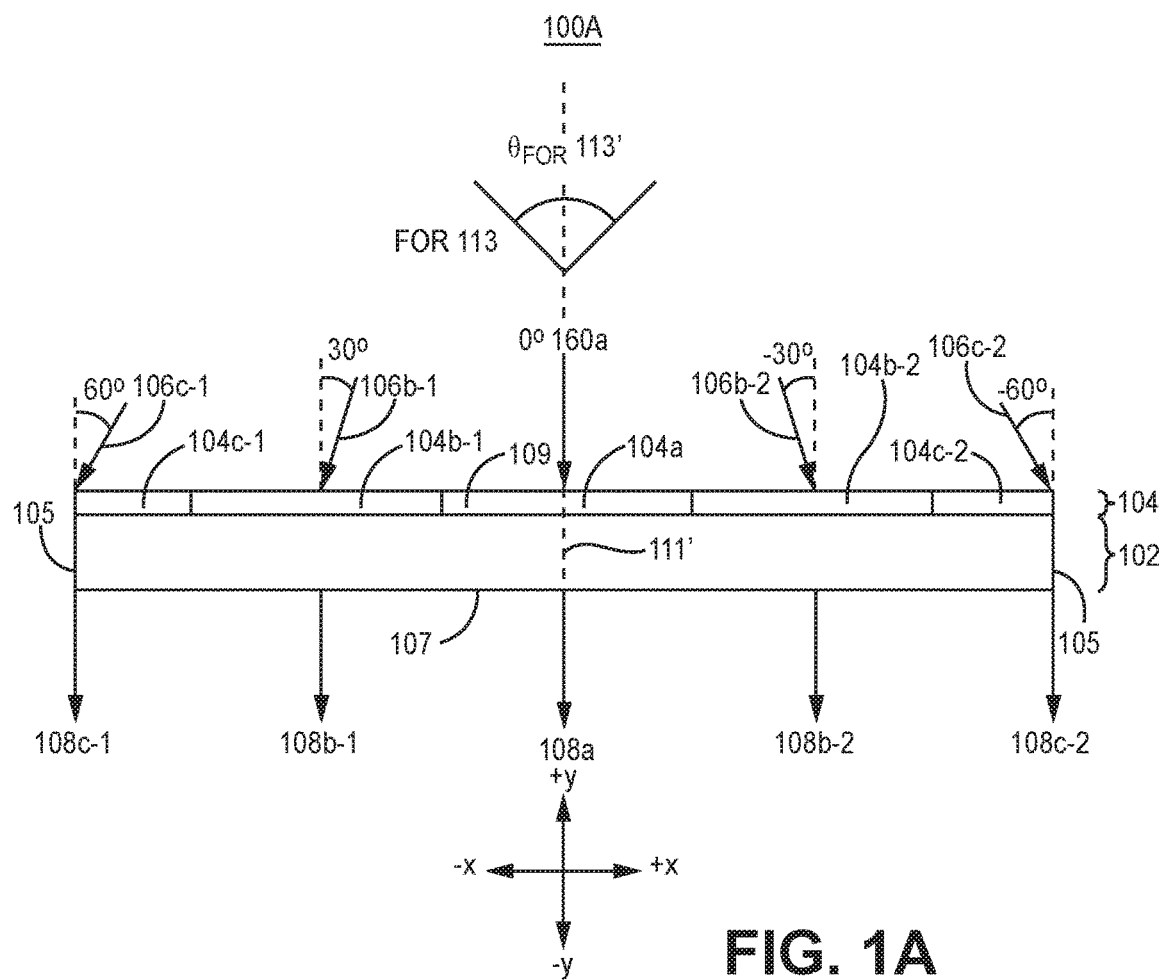
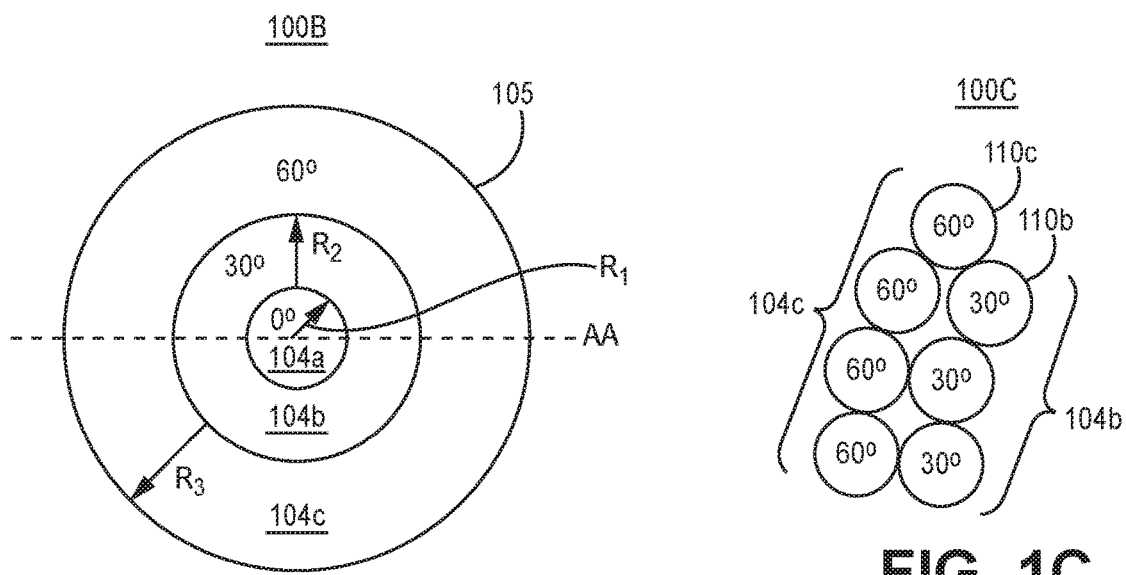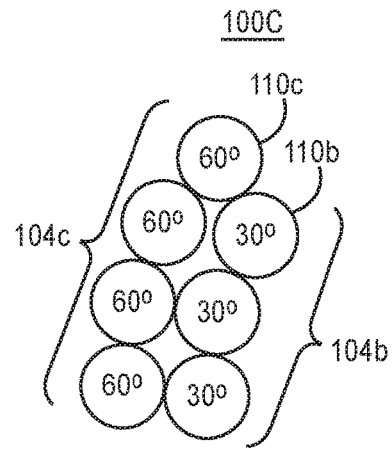
FIG. 1A
FIG. 1B
FIG. 1C

APPARATUS AND METHOD FOR A HOLOGRAPHIC OPTICAL FIELD FLATTENER

STATEMENT REGARDING FEDERALLY SPONSORED RESEARCH OR DEVELOPMENT

This invention was made with Government support under a Restricted Contract # awarded by the Department of the Air Force—AFRL/RWK. The Government has certain rights in the invention.

BACKGROUND

A celestial-aided navigation system is used to correct for errors, such as drift, in inertial sensors in an inertial navigation system in vehicles such as satellites. One example of a celestial-aided navigation system is a star tracker system. A star tracker system is an optical device used to determine location based upon the location of at least one celestial body, e.g. a star or planet, and determines a two dimensional reference frame indicating the position of the celestial object, e.g., in terms of a polar or Cartesian coordinate system.

It is desirable for a star tracker system to have as wide as possible field of regard to ensure that identifiable celestial bodies can be detected by the system. However, as the star tracker system's field of regard increases, optical aberrations occur, e.g. that cause incident light to be projected on a curved plane. However, image sensors, upon which such light is projected, are flat. As a result, such light either may not be detected by the star tracker system, or star tracker system measurements may be erroneous.

SUMMARY

A method is provided. The method comprises: receiving incident light, from an object surface, on a top surface of a holographic optical field flattener (HOFF); transforming direction of light, with a hologram, if the light is incident on a portion of the HOFF at an angle equal to a non-zero field angle of the portion; and emitting transformed light from a bottom surface of the HOFF.

DRAWINGS

Understanding that the drawings depict only exemplary embodiments and are not therefore to be considered limiting in scope, the exemplary embodiments will be described with additional specificity and detail through the use of the accompanying drawings, in which:

FIG. 1A illustrates a cross section of one embodiment of a holographic optical field flattener;

FIG. 1B illustrates a plan view of one embodiment of a holographic optical field flattener;

FIG. 1C illustrates one embodiment of portions of each of a first concentric band and a second concentric band formed respectively by first field angle pixels and second field angle pixels;

In accordance with common practice, the various described features are not drawn to scale but are drawn to emphasize specific features relevant to the exemplary embodiments. Reference characters denote like elements throughout figures and text.

DETAILED DESCRIPTION

Figure 1D:
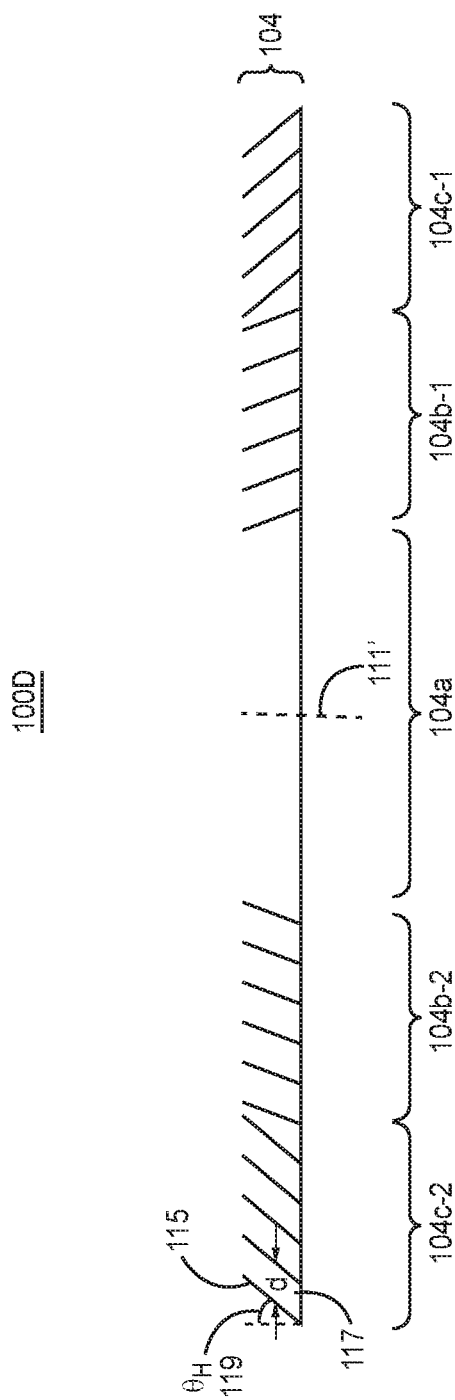
FIG. 1D illustrates a cross-section of one embodiment of holograms of an holographic optical field flattener.

In the following detailed description, reference is made to the accompanying drawings that form a part hereof, and in which is shown by way of illustration specific illustrative embodiments. However, it is to be understood that other embodiments may be utilized and that structural, mechanical, and electrical changes may be made. Furthermore, the method presented in the drawing figures and the specification is not to be construed as limiting the order in which the individual steps may be performed. The following detailed description is, therefore, not to be taken in a limiting sense.

A holographic optical field flattener (HOFF) may be used to overcome the above referenced problem. Embodiments of the HOFF have at least one advantage: light, incident upon the HOFF over varying fields of view across the field of regard, is diffracted to be emitted normal to the HOFF. Thus, the light incident, over varying fields of view, and from an object surface, e.g. a spherical object surface, is emitted by the HOFF onto a flat surface without the aforementioned aberrations.

FIG. 1A illustrates a cross section of one embodiment of a holographic optical field flattener 100A. The holographic optical field flattener 100A has a field of regard (FOR) 113 which is a cone, normal to the holographic optical field flattener 100A, that defines the space from which light will be processed by the holographic filed flattener 100A. The field of regard 113 is defined by an FOR angle ($\theta_{FOR}$) 113' which defines the exterior border of the cone with respect to a centerline 111', e.g. of the cone. For pedagogical purposes, an FOR angle 113' of one hundred and twenty degrees is exemplified herein.

The holographic optical field flattener 100A comprises an optically transparent substrate 102 and holograms 104. A hologram 104 is material comprising an interference pattern that when illuminated produces a three dimensional image. As will be further described, the holograms 104 of the HOFF 100A encode phase information so that the holograms 104 only affect, i.e. transform the direction of, light having specific field angles incident upon the holograms 104.

In the illustrated embodiment, the holograms are recorded in a layer of photoreactive material, e.g. photoresist, disposed on a surface of the optically transparent substrate 102, e.g. glass (such as fused silica) or plastic, upon which light is incident. In another embodiment, the holograms 104 are part of the optically transparent substrate 102; the holograms 104 are formed in the surface, upon which light is incident, of the optically transparent substrate 104.

In one embodiment, the holograms 104 are defined regions of photoreactive material that are exposed using an interferometer, e.g. a system to create a computer generated hologram or a modified bidirectional reflection distribution function apparatus, which create a pattern in the photoreactive material that results in the desired interference pattern in the photoreactive material. Further, the wavelength used to expose the photoreactive material, and thus create the hologram 104, is a frequency that is substantially the center frequency of the band at which the holographic optical field flattener 100A operates.

Although the holograms 104 are described herein as being formed with photoreactive material on the optically transparent substrate 102, it is also contemplated that the holograms 104 are formed in the optically transparent substrate 102. Formation in the optically transparent substrate 102 may be accomplished, e.g. by etching. Such etching may be performed, e.g. with laser ablation.

FIG. 1B illustrates a plan view of one embodiment of a holographic optical field flattener 100B. The embodiment illustrated in FIG. 1B is the same embodiment illustrated in FIG. 1A. The cross section shown in FIG. 1A is illustrated along line AA shown in FIG. 1B.

The holographic optical field flattener 100A, 100B, illustrated in FIGS. 1A and 1B, comprises concentric bands of holograms and/or a center region extending from the center 103 of the holographic optical field flattener 100A, 100B to the HOFF's outermost edge 105. Concentric bands may also be referred to herein as holographic concentric bands.

In one embodiment, illustrated herein, the center region has no interference pattern in the photoreactive material of the center region, and is devoid of the hologram 104. Alternatively, the center region does not even include photoreactive material. However, in other embodiments, the center region may include the hologram 104, e.g. photoreactive material with an interference pattern. In another embodiment, the concentric bands have an interference pattern in the photoreactive material.

The illustrated holographic optical field flattener 100A, 100B includes a center region 104a, a first concentric band 104b, and a second concentric band 104c. In alternative embodiments, fewer (i.e. one) or more (i.e. three or more) concentric bands are used. The first concentric band 104a is formed outside of, or a greater distance away from the center 111 than, the outer edge 104a' of the center region 104. Each successive concentric band is formed outside of, or a greater distance away from the center 111 than, the outer edge of the preceding concentric band.

In one embodiment, the center region 104a is centered about the center 111 of the holographic optical field flattener 100A, and is circular. However, in other embodiments, the center region may not be centered and/or can be another shape, such as an ellipse. In the embodiment illustrated in FIG. 1B, the center region 104a has a radius (a first radial distance) $R_1$ from a center 111 to an outer edge 104a' of the center region 104a. The first concentric band 104b surrounds the center region 104a. The first concentric band 104b has a second radial distance $R_2$ which is the distance of a ray (emanating from the center 111) from the outer edge 104a' of the center region 104a to an outer edge 104b' of the first concentric band 104b. The second concentric band 104c surrounds the first concentric band 104b. The second concentric band 104c has a third radial distance $R_3$ which is the distance of a ray (emanating from the center 111) from between the outer edge 104b' of the first concentric band 104b to the HOFF's outermost edge 105 and outer edges of the second concentric band 104c.

The cross section illustrated in FIG. 1A is applicable for any cross section from outermost edge 105, through the center 111, to the outermost edge 105. Returning to FIG. 1A, the first concentric band 104b and the second concentric band 104B each comprise two portions. The first portion 104b-1 of the first concentric band 104b is on a left hand side of, or a negative X axis with respect to, a center line 111' and a Y axis. The centerline 111' passes through the center 111 of the center region 104a, and is parallel to the Y axis. The centerline 111' and Y axis are parallel to the light emitted from a bottom surface 107 of the holographic optical field flattener 100A. The first portion 104c-1 of the second concentric band 104b is on the left hand side of, or the negative X axis with respect to, the center line 111' through the center region 104a, and the Y axis. The second portion 104b-2 of the first concentric band 104b is on the right hand side or positive X axis with respect to the center line 111' and the Y axis.

The field angle of view, or field angle, as used herein is the angle of light (with respect to the centerline 111') incident upon the top surface 109 that is desired to be emitted from the bottom surface 107 normal to the centerline 111'. Thus, e.g., for the concentric bands, it is the angle of such incident light that is transformed and emitted normal to the centerline 111'.

The light 106a incident normal (or zero degrees from normal) to a top surface 109 of the optically transparent substrate 104 at the center region 104a is emitted 108a normally from the bottom surface 107 of the optically transparent substrate 104. This zero degree from normal angle is referred to as the field angle of view for the center region 104a. In one embodiment, as will be subsequently illustrated, the center region 104a has no holograms.

Only light 106b-1 incident at an angle of thirty degrees to the top surface 109 of the optically transparent substrate 104 at the first portion 104b-1 of the first concentric band 104b is emitted 108b-1 normally from the bottom surface 107 of the optically transparent substrate 104. Only light 106b-2 incident at angle of negative thirty degrees to the top surface 109 of the optically transparent substrate 104 at the second portion 104b-2 of the first concentric band 104b is emitted 108b-2 normally from the bottom surface 107 of the optically transparent substrate 104. The field angle of each concentric band is swept azimuthally around that band. Thus for example, the thirty degree field angle of the first concentric band 104b is swept azimuthally around that band. The sixty degree field angle of the second concentric band 104c is swept azimuthally around that band. To prevent light incident normally on the concentric rings from being emitted from the holographic optical field flattener 100A, 100B at a normal angle, the hologram in each such concentric rings must also cause such normal incident light to be refracted at an angle, e.g. greater than the field of view of an objective lens, so that it is not detected by an image sensor. This can be achieved with standard techniques such as multiplexed holograms.

Only light 106a, 106b, 106c incident at the field angle (of the corresponding center region 104a, the first concentric band 104b, and the second concentric band 104c) with respect to the top surface 109 is emitted normal to the bottom surface 107 of sixty degrees to the top surface 109 of the optically transparent substrate 104 at the first portion 104c-1 of the second concentric band 104c is emitted 108c-1 normally from the bottom surface 107 of the optically transparent substrate 104. Only light 106c-2 incident at angle of negative sixty degrees to the top surface 109 of the optically transparent substrate 104 at the second portion 104c-2 of the second concentric band 104c is emitted 108c-2 normally from the bottom surface 107 of the optically transparent substrate 104. Light incident, at the top surface 109 at an angle other the field angle of view for the corresponding center region (the first concentric band 104b, and the second concentric band 104c), passes through the holographic optical field flattener 100A, 100B without any change to its incident angle. The field angle of view increases from the center 111 of the HOFF 100A, 100B to the outermost edge 105 of the HOFF 100A, 100B. Thus, in the illustrated embodiment, the field angle increases with each successive concentric band further displaced from the center 111.

However, the holographic optical field flattener 100A, 100B can be implemented with holographic regions of arbitrary shapes corresponding to different field angles that are not a center region and concentric bands. For example, the hologram 104 can comprise field angle pixels, described further below, where each field angle pixel has a different field angle of view but in a non sequential order. This implementation would be more complicated requiring additional signal processing of the signals generated by the image sensor to reorder the light so that it would accurately represent the imaged environment.

In one embodiment, the holograms in the center region 104a (if they exist), the first concentric band 104b, and the second concentric band 104c are continuous, e.g. being formed with an interference pattern recorded in, e.g., photoreactive material as discussed above. Alternatively, the holograms 104 are discrete, formed by field angle pixels. FIG. 1C illustrates one embodiment of portions 100C of each of the first concentric band 104b and the second concentric band 104c formed respectively by first field angle pixels 110b and second field angle pixels 110c. In one embodiment, each of first and second field angle pixels 110b, 110c are circular. However, in other embodiments, the first field angle pixels 100b and the second field angel pixels 110c may have other shapes, such as an elliptical shape. The first field angle pixels 110b each have a field angle of view that is less then the field angle of view of the second field pixels 110c. In the embodiment, illustrated in FIG. 1C, the field angle of view of the first field angle pixels 110b and the second field angle pixels 110c is respectively thirty and sixty degrees.

Figure 1E:
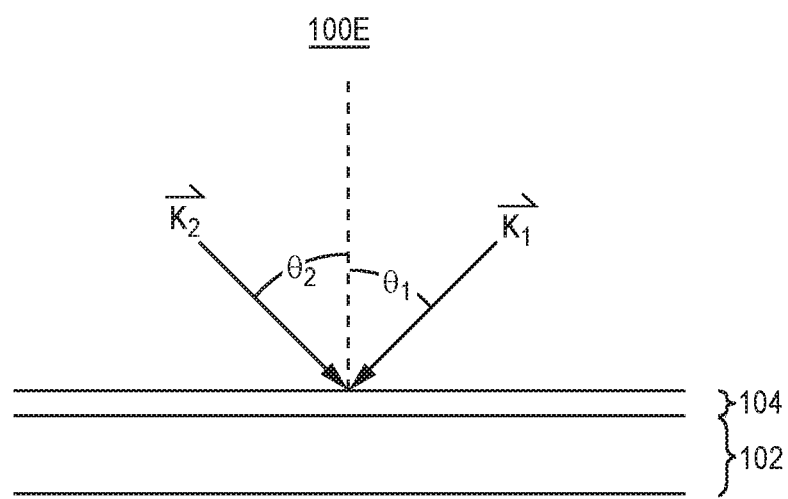
FIG. 1E illustrates an object beam and a reconstruction beam used to generate interference fringes that are holograms.

FIG. 1D illustrates a cross-section of one embodiment of holograms 104 of the holographic optical field flattener 100A, 100B. The cross section shown in FIG. 1C is illustrated along the ray AA shown in FIG. 1B. Each interference fringe 115, of the center region 104a or a concentric band, is at a holographic angle ($\Phi_H$) 119 with an axis parallel to the centerline 111. FIG. 1E illustrates an object beam and a reconstruction beam used to generate the interference fringes 115 that are the holograms 104. Illustrated vectors $\vec{\kappa}_1$ and $\vec{\kappa}_2$ represent the object beam and the reconstruction beam, or visa versa. The beams represented by vectors $\vec{\kappa}_t$ and $\vec{\kappa}_2$ are incident upon the holographic optical field flattener 100A, 100B, 100E respectively at angles $\theta_1$ and $\theta_2$; those angles are with respect to a vector normal to the surface of the holographic optical field flattener 100A, 100B, 100E.

The holographic angle $\theta_H$ is given by:

$$\theta_H = \frac{\pi}{2} + \tan^{-1}\frac{\kappa_x}{\kappa_y},$$

with $\theta_H$ in units of radians, and the interference vector $\kappa$ is given by:

$$\vec{\kappa} = \vec{\kappa}_1 - \vec{\kappa}_2,$$

with the geometry shown in FIG. 1E. Returning to FIG. 1D, the distance (d) 117 between each interference fringe 115 may vary.

Figure 1F:
FIG. 1F illustrates a cross section of another embodiment of a holographic optical field flattener.

FIG. 1F illustrates a cross section of another embodiment of a holographic optical field flattener 100F. In this embodiment, a second optically transparent substrate 120 is placed over the holograms 104 and the first optically transparent substrate 102. The second optically transparent substrate 120 protects the holograms 104 from damage from the environment.

Figure 2A:
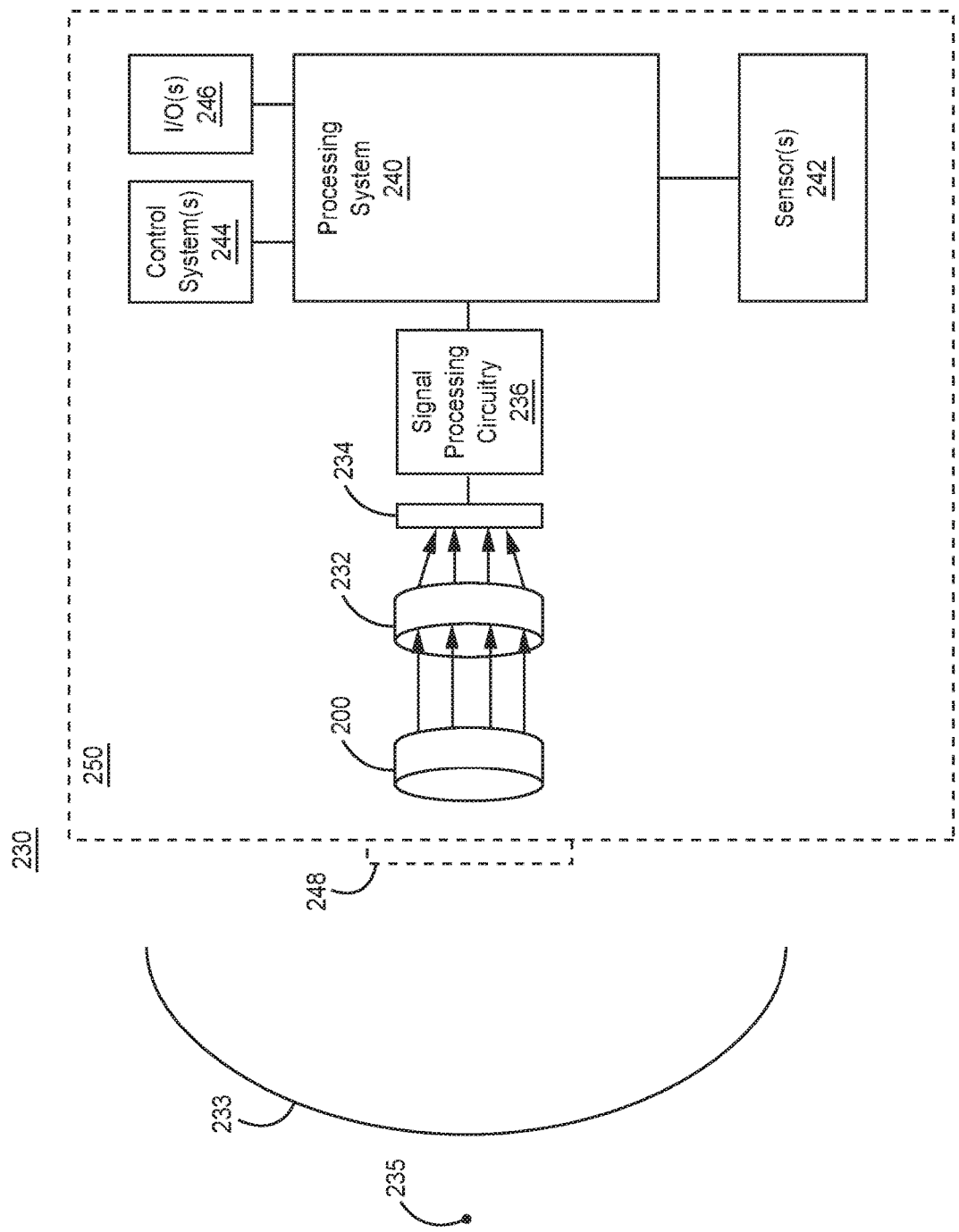
FIG. 2A illustrates one embodiment of a star tracker system including a holographic optical field flattener.

FIG. 2A illustrates one embodiment of a star tracker system including a holographic optical field flattener 200. The star tracker system including the holographic optical field flattener 200 comprises the holographic optical field flattener 200, an objective lens 232, an image sensor 234, signal processing circuitry 236, and a processing system 240. Light from the environment 233, e.g. the atmosphere (such as the sky) or space, is incident upon the holographic optical field flattener 200.

As illustrated in FIG. 1A, light within a field of regard, and having field angles corresponding to the center region 104a and the concentric holograms bands upon which they are incident, is emitted from the holographic optical field flattener 200 at an angle normal to the holographic optical field flattener 200. Light incident upon different radial portions of a concentric band corresponds to different regions of the environment 233 at the same field angle from the center 111. Thus, for example, each field angle pixel corresponds to a different region of the environment 233.

The normalized light is incident upon an objective lens 232, e.g. having a narrow field of view so that only, or substantially only, the normalized light is incident upon the objective lens 232. In another embodiment, the objective lens has an infinity focus. In a further embodiment, the objective lens is a glass or plastic lens, or a mirror system.

The objective lens 232 focuses the incident normalized light so that it is incident upon an image sensor 234. In one embodiment, the image sensor 234 is comprised of pixels, and is either a charge coupled device (CCD) sensor or a complementary metal oxide semiconductor (CMOS) sensor. The image sensor 234 is configured to generate image sensor electrical signals representative of the light or images incident upon the image sensor 234. Thus, for a pixelated image sensor, each pixel will generate an analog signal having an amplitude corresponding to the power of light incident upon the pixel.

In one embodiment, an optically transparent window 248 may separate the holographic optical field flattener 200 from the environment 233. The optically transparent window 248 protects the holographic optical field flattener 200 from being damaged by the environment 248.

The image sensor 234 and the image sensor electrical signals are coupled to signal processing circuitry 236. In one embodiment, the signal processing circuitry 236 includes multiplexing circuitry coupled to an analog to digital converter. The multiplexing circuitry is configured to periodically output the analog signal generated by each pixel. Such analog signals are coupled to the input of the analog to digital converter. The analog to digital converter is configured to generate digitized signals corresponding to the analog signals. An output of the analog to digital converter and the digitized signals are coupled to the output of the signal processing circuitry 236.

The processing system 240 is configured to receive the output of the signal processing circuitry 236. In one embodiment, the processing system 236 is configured to determine what portion of the environment 233 the star tracker system including a holographic optical field flattener 200 is imaging. In another embodiment, the processing circuitry 236 determines the location of the star tracker system including a holographic optical field flattener 200.

In one embodiment, the star tracker system including a holographic optical field flattener 200 is placed in or on a vehicle 250. The vehicle 250 may be a terrestrial borne vehicle, such as a car, truck or tank, a seaborne vehicle such as a ship or a submersible, an airborne vehicle such as a plane, helicopter, or missile, a space borne vehicle such as a rocket, space craft or satellite, or any other vehicle.

In such an embodiment, at least one sensor 242, at least one control system 244 and/or at least one input/output device 246 may also be coupled to the processing system 240. The at least one sensor 242 may include an inertial navigation system (e.g. including accelerometer(s) and gyroscope(s)) and/or a global navigation satellite system receiver (e.g. a GPS receiver). The at least one control system 244 may include one or more systems controlling the speed and direction of the vehicle 250, e.g. (a) control system(s) for controlling surfaces (such as ailerons, elevators, and rudder(s)) and jet engine throttle control system(s) of an aircraft, or (b) rudder and propeller control systems of a ship.

The at least one input/output device 246 permits the display and entry of data, e.g. from the processing system 240 and more specifically from the location determination system 264B and/or navigation system 264B. In one embodiment the at least one input/output device 246 is a touch screen display.

Figure 2B:
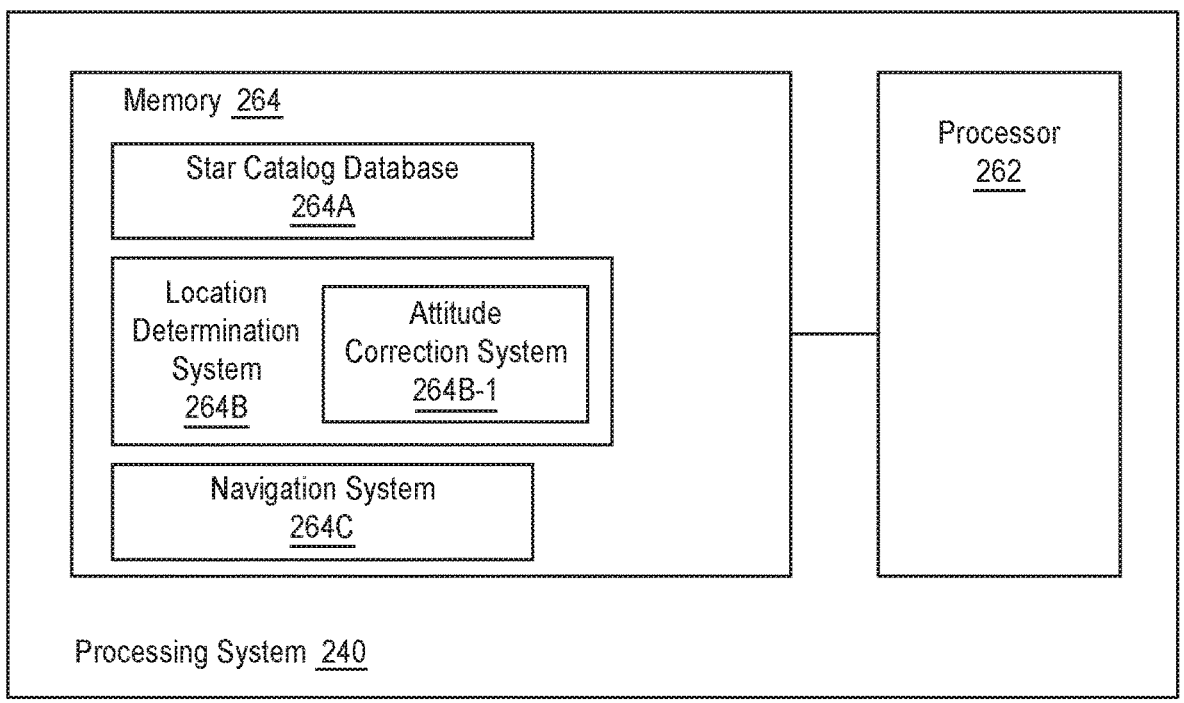
FIG. 2B illustrates a block diagram of one embodiment of a processing system.

FIG. 2B illustrates a block diagram of one embodiment of the processing system 240. The processing system 240 comprises a processor 262 coupled to a memory 264. In an alternative embodiments, the processor 262 and/or the memory 264 may be implemented by a field programmable gate array and/or a state machine. The processor 262 may be a central processing unit, a digital signal processor, or any other type of processing circuitry. The memory 264 may be random access, flash, or any other type of memory.

In one embodiment, the memory 264 includes a star catalog database 264A and a location determination system 244B. The star catalog database 264A includes the locations of visible celestial bodies 235 in the environment 233. In another embodiment, the star catalog database 264A may be dynamic, accounting for the movement over time of the earth and other celestial bodies 235.

In one embodiment, the location determination system 264B is configured to receive the digitized signal corresponding to the image of the environment 233 detected by the image sensor. The location determination system 264B is configured to determine a region of the environment 233 that has been imaged based upon aligning imaged light sources corresponding to celestial bodies 235 in the environment 233 with the positions of celestial bodies 235 stored in the star catalog database 264A.

In one embodiment, when the star tracker system including a holographic optical field flattener 200 is placed in or on a vehicle 250, the location and determination system 264B also determines the location of the vehicle 250. In another embodiment, the location and determination system 264B includes an attitude correction system 264B-1. Attitude is the orientation of an object with respect to an inertial frame of reference or another entity, e.g. a celestial object. The attitude correction system 264B-1 corrects vehicle attitude generated by the at least one sensor 242 (e.g. an inertial navigation system) using (a) attitude data from the star tracker system including a holographic optical field flattener 200 and (b) an estimator, e.g. a Kalman filter. In a further embodiment, the memory 264 also includes a navigation system 264C is stores the intended trajectory and/or destination of the vehicle 250. In a further embodiment, the navigation system 264 generates control signals, e.g. based upon data from the location determination system 265B, and/or more specifically the attitude correction system 264B-1. The control signals are configured to be provided from the processing system 240 and received by the at least one control system 244 so as to maintain the vehicle 250 on the proper trajectory, or to otherwise assure it arrives at its intended destination.

Figure 3:
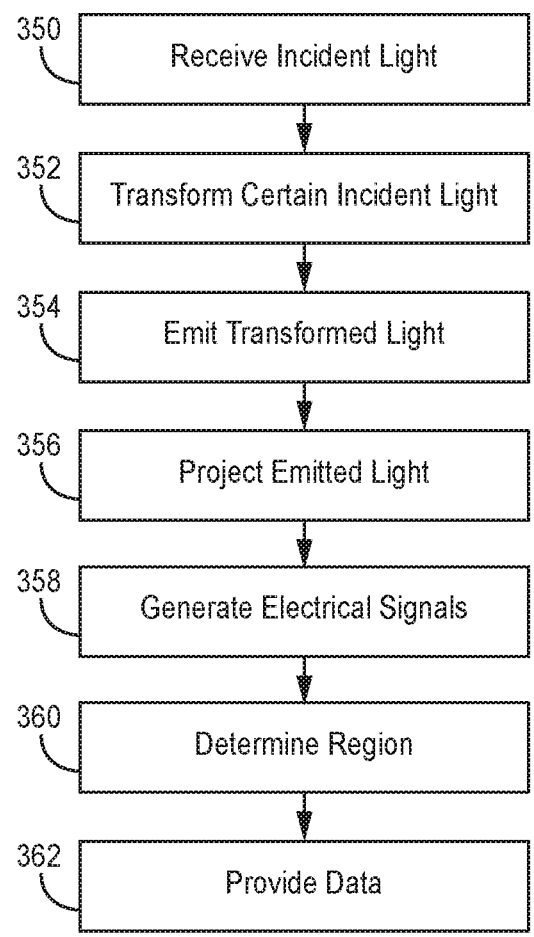
FIG. 3 illustrates one embodiment of a method of operation of a star tracker system including a holographic optical field flattener.

FIG. 3 illustrates one embodiment of a method of operation of a star tracker system including a holographic optical field flattener 300. To the extent that the embodiment of method 300 shown in FIG. 3 is described herein as being implemented in the systems shown in FIGS. 1A through 2B, it is to be understood that other embodiments can be implemented in other ways. The blocks of the flow diagrams have been arranged in a generally sequential manner for ease of explanation; however, it is to be understood that this arrangement is merely exemplary, and it should be recognized that the processing associated with the methods (and the blocks shown in the Figure) can occur in a different order (for example, where at least some of the processing associated with the blocks is performed in parallel and/or in an event-driven manner).

In block 350, receive incident light (from the environment, e.g. the atmosphere (such as the sky) or space) upon a top surface of a holographic optical field flattener (HOFF). In block 352, if the light is incident at an angle equal to a non-zero field angle of view of a portion of the HOFF, e.g. a concentric band, where the light is incident, then transform the direction of the light with a hologram. In block 354, emit the transformed light from the bottom surface of the HOFF at an angle normal to the bottom surface. In one embodiment, light—incident normal to the top surface of the HOFF in a portion of the HOFF, e.g. the center region, where the field angle is zero degrees—is also emitted from the bottom surface of the HOFF at an angle normal to the bottom surface.

In block 356, project the light emitted at an angle normal to the bottom surface of the HOFF onto an image sensor. In one embodiment, focus such light—emitted at an angle normal to the bottom surface of the HOFF—onto the image sensor.

In block 358, generate electrical signals from the image sensor. In one embodiment, process, e.g. multiplex and/or digitize, such electrical signals from the image sensor.

In block, 360, determine a region of the environment that has been imaged based upon aligning imaged light sources corresponding to celestial bodies 235 in the environment with the positions of celestial bodies, e.g. stored in the star catalog database.

In one embodiment, in block 362, provide data, corresponding to the region determination, to an attitude correction system, e.g. of a vehicle or another device such as a radio telescope.

Terms of relative position as used in this application are defined based on a plane parallel to, or in the case of the term coplanar—the same plane as, the conventional plane or working surface of a layer, wafer, or substrate, regardless of orientation. The term "horizontal" or "lateral" as used in this application are defined as a plane parallel to the conventional plane or working surface of a layer, wafer, or substrate, regardless of orientation. The term "vertical" refers to a direction perpendicular to the horizontal. Terms such as "on," "side" (as in "sidewall"), "higher," "lower," "over," "top," and "under" are defined with respect to the conventional plane or working surface being on the top surface of a layer, wafer, or substrate, regardless of orientation. The term "coplanar" as used in this application is defined as a plane in the same plane as the conventional plane or working surface of a layer, wafer, or substrate, regardless of orientation.

EXAMPLE EMBODIMENTS

Example 1 includes an apparatus, comprising: an optically transparent substrate; and at least one holographic region on or in the optically transparent substrate where each of the at least one region has a corresponding field angle.

Example 2 includes the apparatus of Example 1, wherein the at least one holographic region comprises: a center region, having a center; at least one holographic concentric band on or in the optically transparent substrate and around the center region; wherein each successive holographic concentric band is increasingly radially distant from the center of the center region; and wherein the center region and each of the at least one holographic concentric band has a field angle that increases with each successive concentric band.

Example 3 includes the apparatus of any of Examples 1-2, wherein each holographic concentric band is comprised of holographic field angle pixels.

Example 4 includes the apparatus of any of Examples 1-3, wherein each of the at least one holographic concentric band comprises a multiplexed hologram to prevent light incident normally on each of the at least one concentric rings from being emitted from the optically transparent substrate at a normal angle Example 5 includes the apparatus of any of Examples 1-4, wherein holograms are etched into the optically transparent substrate at the at least one holographic region.

Example 6 includes the apparatus of any of Examples 1-5, further comprising a second optically transparent substrate above the at least one holographic region.

Example 7 includes a system, comprising: a holographic optical field flattener, comprising: an optically transparent substrate; and at least one region on or in the optically transparent substrate where each of the at least one region has a corresponding field angle; an objective lens configured to receive the light emitted by the holographic optical field flattener, and emit light; an image sensor configured to receive light emitted from the objective lens, and generate electrical signals corresponding to the light received by the image sensor; signal processing circuitry coupled to the image sensor and configured to receive the generated electrical signals; and a processing system coupled to the signal processing circuitry.

Example 8 includes the system of Example 7, wherein the at least one region comprises: a center region, having a center; at least one concentric band of holograms on or in the optically transparent substrate and around the center region; wherein each successive concentric band is increasingly radially distant from the center of the center region; and wherein the center region and each of the at least one concentric band has a field angle that increases with each successive concentric band.

Example 9 includes the system of any of Examples 7-8, wherein the processing system comprises: a processor; and a memory, coupled to the processor, wherein the memory further comprises: a star catalog database; and a location determination system.

Example 10 includes the system of Example 9, further comprising at least one sensor coupled to the processing system; wherein the memory further comprises a navigation system; and wherein the location determination system further comprises an attitude correction system.

Example 11 includes the system of Example 10, further comprising at least one control system coupled to the processing system; wherein the navigation system is configured to generate control signals; and the at least one control system is configure to receive the control signals.

Example 12 includes the system of Example 11, further comprising at least one sensor coupled to the processing system; and wherein the location determination system comprises an attitude correction system.

Example 13 includes the system of Example 12, wherein the at least one sensor is an inertial navigation system.

Example 14 includes the system of any of Examples 7-13, wherein the holograms are etched into the optically transparent substrate at the at least one holographic region.

Example 15 includes a method, comprising: receiving incident light, from an object surface, on a top surface of a holographic optical field flattener (HOFF); transforming direction of light, with a hologram, if the light is incident on a portion of the HOFF at an angle equal to a non-zero field angle of the portion; and emitting transformed light from a bottom surface of the HOFF.

Example 16 includes the method of Example 15, further comprising: wherein receiving incident light includes receiving light that is incident normal to the top surface on a portion of the HOFF having a zero field angle; and emitting the received light incident normal to the top surface from the bottom surface of the HOFF at an angle normal to the bottom surface.

Example 17 includes the method of any of Examples 15-16, further comprising projecting the emitted transformed light onto an image sensor.

Example 18 includes the method of any of Examples 15-17, wherein projecting the emitted transformed light onto the image sensor further comprises focusing the emitted transformed light onto the image sensor.

Example 19 includes the method of any of Examples 17-18, further comprising generating electrical signals from the image sensor that correspond to the emitted, transformed light projected onto the image sensor.

Example 20 includes the method of Example 19, wherein generating electrical signals comprises at least one of multiplexing such electrical signals, and digitizing such electrical signals Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:
1. An apparatus, comprising:
an optically transparent substrate having a first surface and a second surface opposite the first surface;
a center region, having a center;
at least one holographic concentric band on or in a first surface of the optically transparent substrate and around the center region;
wherein each successive holographic concentric band is increasingly radially distant from the center of the center region;

wherein the center region and each of the at least one holographic concentric band has a field angle that increases with each successive concentric band further displaced from the center; and wherein each holographic concentric band is comprised of a set of holographic field angle pixels, where each field angle pixel in a set has the same field angle of view, where the field angle of view of each field angle pixel in a set is greater than the first field angle of view, where the field angle of view for each set of holographic field angle pixels of a holographic concentric band increases as the holographic concentric band's radial distance from the center of the center region increases, where the center region and each holographic concentric band are configured to transmit, normal to the second surface of the optically transparent substrate, light incident at an angle equal to a corresponding field angle, and where each holographic concentric band has a non-zero field angle.

2. The apparatus of claim 1, wherein each of the holographic field angle pixels has a circular or elliptical cross section shape.

3. The apparatus of claim 1, wherein each of the at least one holographic concentric band comprises a multiplexed hologram to prevent light incident normally on each of the at least one concentric rings from being emitted from the optically transparent substrate at a normal angle.

4. The apparatus of claim 1, wherein holograms are etched into the optically transparent substrate at the at least one holographic region.

5. The apparatus of claim 1, further comprising a second optically transparent substrate above the at least one holographic region.

6. A system, comprising:
a holographic optical field flattener, comprising:
an optically transparent substrate having a first surface and a second surface opposite the first surface;
a center region, having a center;
at least one holographic concentric band on or in the optically transparent substrate and around the center region; and
wherein each successive holographic concentric band is increasingly radially distant from the center of the center region;
wherein the center region and each of the at least one holographic concentric band has a field angle that increases with each successive concentric band further displaced from the center; and
wherein each holographic concentric band is comprised of a set of holographic field angle pixels, where each field angle pixel in a set has the same field angle of view, where the field angle of view of each field angle pixel in a set is greater than the first field angle of view, and where the field angle of view for each set of holographic field angle pixels of a holographic concentric band increases as the holographic concentric band's radial distance from the center of the center region increases, where the center region and each holographic concentric band are configured to transmit, normal to the second surface of the optically transparent substrate, light incident at an angle equal to a corresponding field angle, and where each holographic concentric band has a non-zero field angle;
an objective lens configured to receive the light emitted by the holographic optical field flattener, and emit light;
an image sensor configured to receive light emitted from the objective lens, and generate electrical signals corresponding to the light received by the image sensor;
signal processing circuitry coupled to the image sensor and configured to receive the generated electrical signals; and
a processing system coupled to the signal processing circuitry.

7. The system of claim 6, wherein the processing system comprises:
a processor; and
a memory, coupled to the processor, wherein the memory further comprises:
a star catalog database; and
a location determination system.

8. The system of claim 7, further comprising at least one sensor coupled to the processing system;
wherein the memory further comprises a navigation system; and
wherein the location determination system further comprises an attitude correction system.

9. The system of claim 8, further comprising at least one control system coupled to the processing system;
wherein the navigation system is configured to generate control signals; and
wherein the at least one control system is configured to receive the control signals.

10. The system of claim 9, further comprising at least one sensor coupled to the processing system; and
wherein the location determination system comprises an attitude correction system.

11. The system of claim 10, wherein the at least one sensor is an inertial navigation system.

12. The system of claim 6, wherein the holograms are etched into the optically transparent substrate at the at least one holographic region.

13. The system of claim 6, wherein each of the holographic field angle pixels has a circular or elliptical cross section shape.

* * * * *